United States Patent
Soryal et al.

(10) Patent No.: US 11,423,623 B2
(45) Date of Patent: Aug. 23, 2022

(54) PROJECTING VIRTUAL PRESENCES ALONG A MOVING TRAJECTORY

(71) Applicant: AT&T Intellectual Property I, L.P., Atlanta, GA (US)

(72) Inventors: Joseph Soryal, Ridgewood, NY (US); Naila Jaoude, Eatontown, NJ (US); Samuel N. Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 94 days.

(21) Appl. No.: 16/898,131

(22) Filed: Jun. 10, 2020

(65) Prior Publication Data

US 2021/0390779 A1    Dec. 16, 2021

(51) Int. Cl.
*G06T 19/00* (2011.01)
*G02B 27/01* (2006.01)
*H04W 4/029* (2018.01)
*H04W 4/021* (2018.01)

(52) U.S. Cl.
CPC ........ *G06T 19/006* (2013.01); *G02B 27/0179* (2013.01); *G06T 19/003* (2013.01); *H04W 4/021* (2013.01); *H04W 4/029* (2018.02); *G02B 2027/0183* (2013.01)

(58) Field of Classification Search
None
See application file for complete search history.

(56) References Cited

U.S. PATENT DOCUMENTS

| | | | |
|---|---|---|---|
| 9,262,487 B2 | 2/2016 | Youssef et al. | |
| 9,549,290 B2 * | 1/2017 | Smith | H04W 4/026 |
| 10,165,406 B2 | 12/2018 | Hong et al. | |
| 10,410,523 B1 * | 9/2019 | Bostick | G08G 1/166 |
| 10,571,863 B2 | 2/2020 | Bostick et al. | |
| 10,574,662 B2 | 2/2020 | Wolf et al. | |
| 10,650,235 B2 | 5/2020 | Zhou et al. | |
| 2015/0133091 A1 * | 5/2015 | Baldwin | H04W 64/006 455/414.1 |
| 2015/0181388 A1 * | 6/2015 | Smith | H04W 36/08 455/556.1 |
| 2019/0196404 A1 * | 6/2019 | Bostick | G03H 1/2294 |
| 2020/0142354 A1 | 5/2020 | Dhawan et al. | |

FOREIGN PATENT DOCUMENTS

KR    WO2018/070633 A1    4/2018

* cited by examiner

*Primary Examiner* — Hilina K Demeter

(57) ABSTRACT

In one example, a method performed by a processing system includes controlling a first device in a first location to project a virtual presences in a current field of view of a subscriber of a virtual presence projection service, computing a moving trajectory of the subscriber from the first location to a second location, identifying a second device that is located along the moving trajectory, wherein the second device includes a second set of resources for projecting virtual presences, and wherein the second device is registered with the virtual presence projection service to lend the second set of resources to subscribers of the virtual presence projection service, and controlling the second device to project the virtual presence in the current field of view of the subscriber when the subscriber is no longer within range of the first device but is within range of the second device.

20 Claims, 3 Drawing Sheets

PROJECTING VIRTUAL PRESENCES ALONG A MOVING TRAJECTORY

The present disclosure relates generally to immersive media, and more particularly to methods, computer-readable media, and apparatuses for projecting virtual presences along a user's moving trajectory.

BACKGROUND

A hologram is a type of virtual presence in which a physical recording of an interference pattern uses diffraction to produce a three-dimensional image. Many consumer applications communicate information in the form of virtual presences such as holographic projections. For instance, a navigation application executing on a user's mobile phone may project a hologram image of a recommended route by which the user may travel to a requested destination. A gaming or video application may use holographic images to produce an extended reality environment without requiring the user to wear bulky or expensive equipment (such as head mounted displays).

SUMMARY

Methods, computer-readable media, and apparatuses for projecting virtual presences along a moving trajectory are described. In one example, a method performed by a processing system including at least one processor includes controlling a first device in a first location to project a virtual presence in a current field of view of a subscriber of a virtual presence projection service, computing a moving trajectory of the subscriber from the first location to a second location, identifying a second device that is located along the moving trajectory, wherein the second device includes a second set of resources for projecting virtual presences, and wherein the second device is registered with the virtual presence projection service to lend the second set of resources to subscribers of the virtual presence projection service, and controlling the second device to project the virtual presence in the current field of view of the subscriber when the subscriber is no longer within range of the first device but is within range of the second device.

In another example, a non-transitory computer-readable medium stores instructions which, when executed by a processing system including at least one processor, cause the processing system to perform operations. The operations include controlling a first device in a first location to project a virtual presence in a current field of view of a subscriber of a virtual presence projection service, computing a moving trajectory of the subscriber from the first location to a second location, identifying a second device that is located along the moving trajectory, wherein the second device includes a second set of resources for projecting virtual presences, and wherein the second device is registered with the virtual presence projection service to lend the second set of resources to subscribers of the virtual presence projection service, and controlling the second device to project the virtual presence in the current field of view of the subscriber when the subscriber is no longer within range of the first device but is within range of the second device.

In another example, an apparatus includes a processing system including at least one processor and a non-transitory computer-readable medium storing instructions which, when executed by a processing system including the at least one processor, cause the processing system to perform operations. The operations include controlling a first device in a first location to project a virtual presence in a current field of view of a subscriber of a virtual presence projection service, computing a moving trajectory of the subscriber from the first location to a second location, identifying a second device that is located along the moving trajectory, wherein the second device includes a second set of resources for projecting virtual presences, and wherein the second device is registered with the virtual presence projection service to lend the second set of resources to subscribers of the virtual presence projection service, and controlling the second device to project the virtual presence in the current field of view of the subscriber when the subscriber is no longer within range of the first device but is within range of the second device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
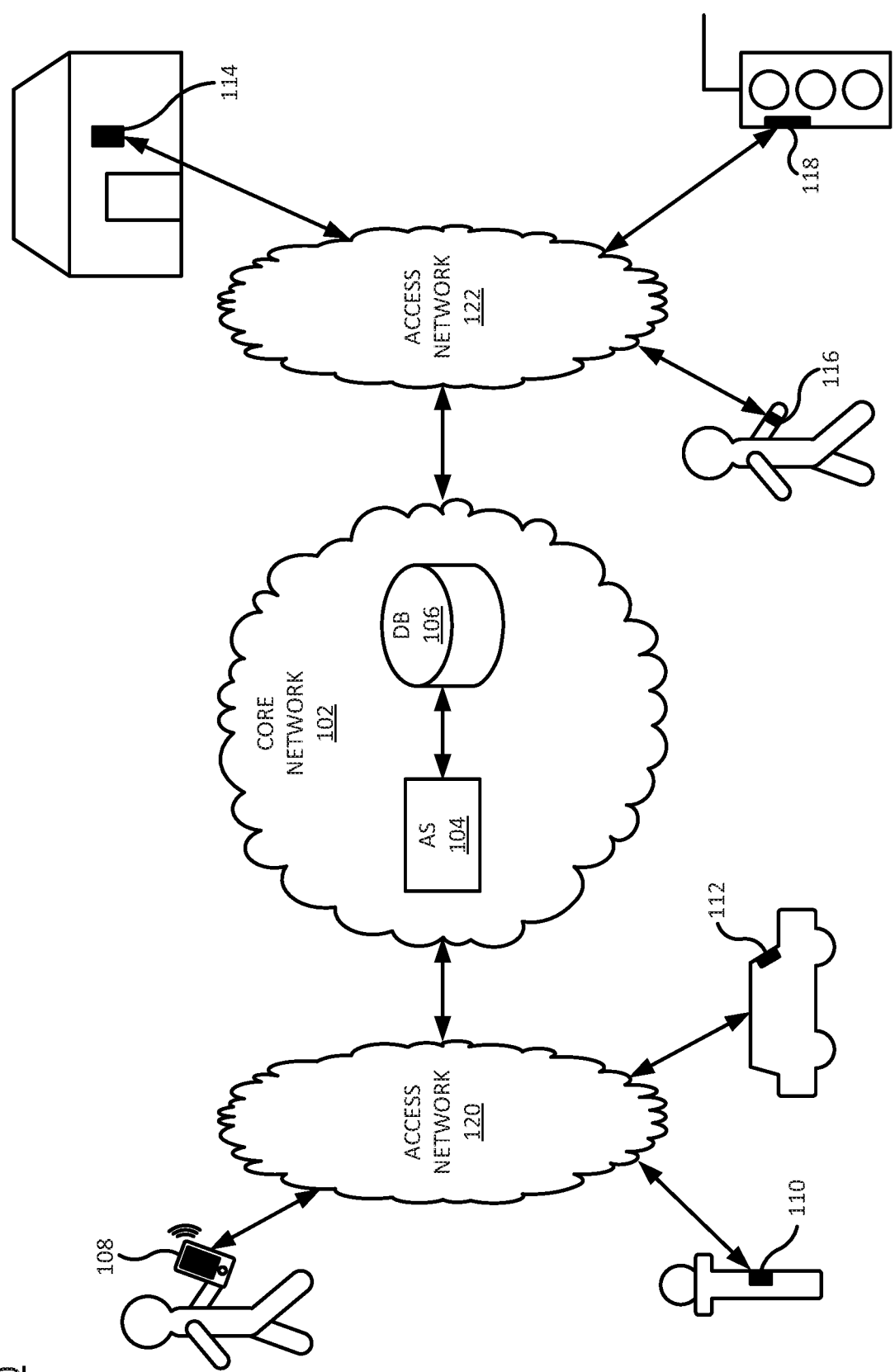
FIG. 1 illustrates an example system in which examples of the present disclosure for projecting virtual presences along a user's moving trajectory may operate.

Examples of the present disclosure project virtual presences (e.g., holographic images) along a user's moving trajectory. As discussed above, many consumer applications communicate information in the form of virtual presences such as holographic projections. For instance, a navigation application executing on a user's mobile phone may project a hologram image of a recommended route by which the user may travel to a requested destination. A gaming or video application may use holographic images to produce an extended reality environment without requiring the user to wear bulky or expensive equipment (such as head mounted displays).

Using virtual presences for these applications may create an experience that is more immersive than simply looking at a flat screen. However, to date, many conventional display devices do not have the capability to project virtual presences as a default. Thus, a user who is using an application that projects virtual presences may be forced to remain in one location (i.e., the location of the display device projecting the virtual presences) for as long as he or she is using the application. This may not always be feasible. For instance, a user may be using a navigation application that projects directions in the form of holographic images onto a heads up display that is part of the user's vehicle's windshield. Thus, when the user exits the vehicle, the holographic images may no longer be available. However, the user may still require directions from the location at which the vehicle is parked to the user's final destination.

Examples of the present disclosure provide a virtual presence that moves with a user, by borrowing resources from devices located along the user's moving trajectory. In one example, the user's moving trajectory is known or monitored as the user interacts with an application that involves the projection of a virtual presence (e.g., a navigation application, a medical application, a video conferencing application, a law enforcement application, or the like). Devices that are located along the user's moving trajectory, and which have volunteered (e.g., via subscription or specific consent) to lend resources for projecting virtual presences, may be identified. As the user moves along the moving trajectory, then, the virtual presence may be "handed off" from device to device (e.g., as the user moves out of range of one device and within range of a next device). In this manner, a continuous or near continuous virtual presence may be presented to a moving user in a manner than is substantially seamless (e.g., without lengthy pauses or interruptions of the virtual presence). In further examples, projection of the virtual presence may also be adjusted to compensate for changes conditions in the surrounding environment (e.g., loud noises, changes in lighting, presence of other individuals, etc.). These and other aspects of the present disclosure are described in greater detail below in connection with the examples of FIGS. 1-3.

Within the context of the present disclosure, the term "virtual presence" is understood to refer to any media that creates the appearance that a person (or any other entities such as parts of a person such as a head, a limb, a hand or one or more fingers, or an animated or simulated person or object) is communicating or interacting with one or more other people or entities. In other words, a virtual presence may simulate the presence of another person or entity, potentially including that other person's or entity's visible and/or audible presence. For instance, a virtual presence could comprise a holographic image (potentially with accompanying audio) or an image generated by a system such as the IMAX 3D system. A virtual presence may have a visual component only, an audio component only, or both an audio component and a visual component.

To further aid in understanding the present disclosure, FIG. 1 illustrates an example system 100 in which examples of the present disclosure for projecting virtual presences along a user's moving trajectory may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a core network (e.g., a telecommunication network) 102. The core network 102 may be in communication with one or more access networks 120 and 122, and the Internet (not shown). In one example, the core network 102 may combine core network components of a cellular network with components of a triple play service network, where triple-play services include telephone services, Internet services and television services to subscribers. For example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may further comprise a broadcast television network, e.g., a traditional cable provider network or an Internet Protocol Television (IPTV) network, as well as an Internet Service Provider (ISP) network. In one example, the core network 102 may include a plurality of television (TV) servers (e.g., a broadcast server, a cable head-end), a plurality of content servers, an advertising server (AS), an interactive TV/video on demand (VoD) server, and so forth. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute for Electrical and Electronics Engineers (IEEE) 802.11/Wi-Fi network and the like), cellular access networks, $3^{rd}$ party networks, and the like. For example, the operator of the core network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with one or more devices 108-112. Similarly, the access network 122 may be in communication with one or more devices 114-118. Access networks 120 and 122 may transmit and receive communications between devices 108-118, between devices 108-118, application server (AS) 104, and/or database (DB) 106, other components of the core network 102, devices reachable via the Internet in general, and so forth. In one example, each of the devices 108-118 may comprise any single device or combination of devices that may comprise a user endpoint (UE) device. For example, the devices 108-118 may each comprise a mobile device, a cellular smart phone, a laptop, a tablet computer, a desktop computer, a wearable smart device (e.g., a smart watch or smart glasses), an application server, a bank or cluster of such devices, and the like. In one example, devices 108-118 may comprise AR devices such as heads-up displays, wearable or non-wearable optical see-through or video see-through devices, handheld computing devices with at least a camera and a display, and so forth.

In one example, at least some of the devices 108-118 include resources that may be used to monitor an individual's moving trajectory (e.g., cameras, microphones, accelerometers, motion sensors, and/or other types of sensors). In a further example, at least some of the devices 108-118 include resources that may be used to project virtual presences (e.g., light sources (e.g., lasers, light-emitting diodes, or organic light-emitting diodes), projectors, lens, speakers, and/or other types of output devices). The devices and resources may be integrated into user endpoint devices or into fixed structures or items. For instance, as illustrated in FIG. 1, the device 108 may comprise a smart phone, the device 110 may comprise a lamp post (or be mounted in a lamp post), the device 112 may comprise a vehicle (or be mounted on a vehicle), the device 114 may be mounted on a building, the device 116 may comprise a smart watch or a fitness tracker, and the device 118 may comprise a traffic signal (or be mounted of a traffic signal).

In one example, devices 108-118 may each comprise programs, logic or instructions for performing functions in connection with examples of the present disclosure for projecting virtual presences along a user's moving trajectory. For example, devices 108-118 may each comprise a computing system or device, such as computing system 300 depicted in FIG. 3, and may be configured to provide one or more operations or functions in connection with examples of the present disclosure for projecting virtual presences along a user's moving trajectory, as described herein.

Figure 3:
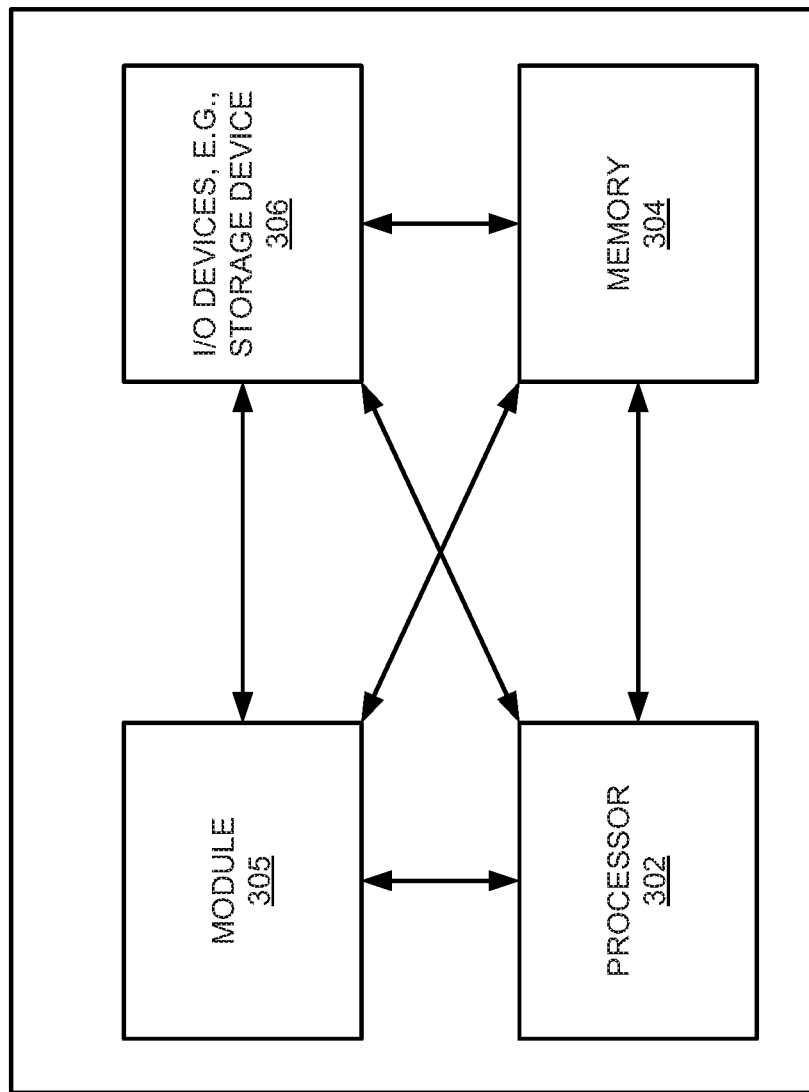
FIG. 3 depicts a high-level block diagram of a computing device or processing system specifically programmed to perform the functions described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, DB 106 may comprise a physical storage device integrated with AS 104 (e.g., a database server), or attached or coupled to the AS 104, to store various types of information in support of systems for projecting virtual presences along a user's moving trajectory. For example, DB 106 may store information about devices, such as any of devices 108-118 and additional devices not illustrated, that are registered to lend resources to support projecting virtual presences along a user's moving trajectory. As discussed above, devices may register with a service (e.g., offered by a service provider of core network 102 as a subscribed service or by a third party entity other than the service provider of core network 102) to lend resources that may help to monitor an individual's moving trajectory and/or to project virtual presences along the individual's moving trajectory. Thus, the DB 106 may store, for each registered device, one or more of the following types of data: a device identifier (e.g., an IP address, a MAC address, a serial number, a phone number, or another type of identifier), the types of resources that the device has registered to lend (e.g., cameras, projectors, speakers, microphones, speedometers, and/or other types of sensors), the location of the device (e.g., a fixed location for a device that is not mobile or a location history/most recent location for a device that is mobile), and/or other types of data.

To illustrate, AS 104 (or any of devices 108-118, if the device has sufficient processing power) may identify a current location of an individual based on a global positioning system signal from the individual's mobile phone. The individual's location history over a prior period of time (e.g., last x minutes) may be used to estimate the individual's likely moving trajectory (e.g., where the user will be in the next y seconds). The DB 106 may then be queried to identify any registered devices along the moving trajectory that may be able to lend resources to project a virtual presence along the individual's moving trajectory.

The AS 104 may also continuously track the respective locations and resource availabilities of the UE devices 108-118 and update the DB 106 accordingly. For instance, in one example, the locations of the UE devices 108-118 may be tracked up to the centimeter level. The AS 104 may also track the UE devices' respective current resource usage levels, such as central processing unit (CPU) usage, memory usage, bandwidth usage, and whether any of the resources required specifically for the projection of virtual presences (e.g., light sources, projectors, speakers, etc.) are currently in use by other applications.

Although only a single AS 104 and a single DB 106 are illustrated, it should be noted that any number of servers 104 or databases 106 may be deployed. In addition, AS 104 and/or DB 106 may comprise public or private cloud computing resources, e.g., one or more host devices/servers in one or more data centers to host virtual machines (VMs), containers, or the like comprising various functions, services, and so on.

In one example, AS 104 and/or DB 106 may operate in a distributed and/or coordinated manner to perform various steps, functions, and/or operations described herein. In one example, application server 104 may comprise network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102 and/or access networks 120 and 122 may comprise a content distribution network (CDN) having ingest servers, edge servers, and the like.

Similarly, although only two access networks 120 and 122 are shown, in other examples, access networks 120 and/or 122 may each comprise a plurality of different access networks that may interface with the core network 102 independently or in a chained manner. For example, devices 108-112 may access the core network 102 via different access networks, devices 114-118 may access the core network 102 via different access networks, and so forth. Thus, these and other modifications are all contemplated within the scope of the present disclosure.

Figure 2:
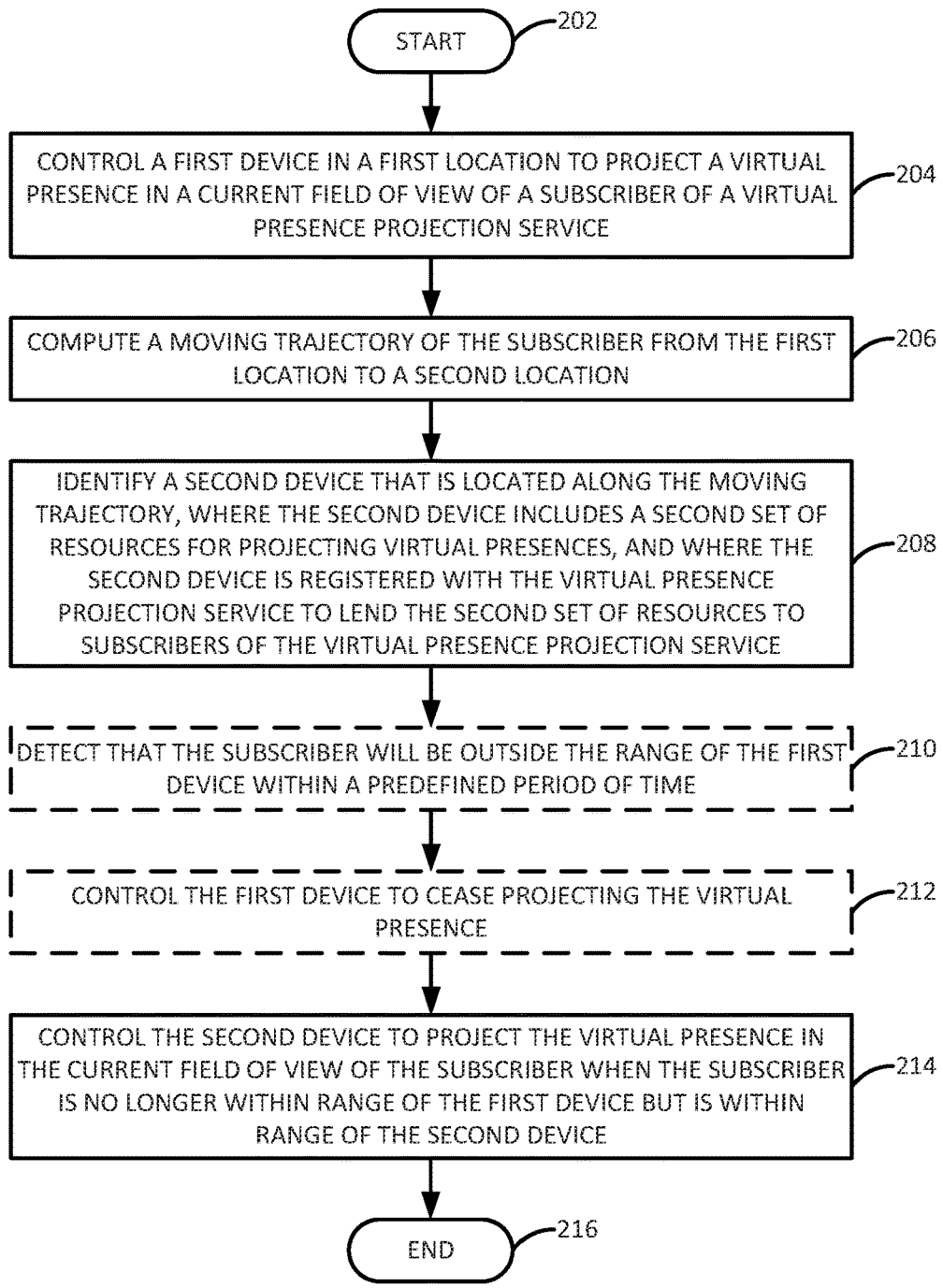
FIG. 2 illustrates a flowchart of an example method for projecting virtual presences along a user's moving trajectory, in accordance with the present disclosure.

FIG. 2 illustrates a flowchart of an example method 200 for projecting virtual presences along a user's moving trajectory, in accordance with the present disclosure. In one example, the method 200 is performed by a component of the system 100 of FIG. 1, such as by any of the user endpoint devices 108-118, the application server 104, and/or any one or more components thereof (e.g., a processor, or processors, performing operations stored in and loaded from a memory), or by any of the user endpoint devices 108-118 or the application server 104 in conjunction with one or more other devices, such as a different one or more of any of the user endpoint devices 108-118, the application server 104, and so forth.

In one example, the steps, functions, or operations of method 200 may be performed by a computing device or system 300, and/or processor 302 as described in connection with FIG. 3 below. For instance, the computing device or system 300 may represent any one or more components of a user endpoint device 108-118 or application server 104 in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 202 and proceeds to step 204.

In step 204, the processing system may control a first device in a first location to project a virtual presence (e.g., a hologram of a human head, a pointing finger, an arrow, a pointing hand, a pointing sign, a short text message, and so on) in a current field of view of a subscriber of a virtual presence projection service. In one example, the subscriber may subscribe to the virtual presence projection service in conjunction with a software application that may execute on a mobile user endpoint device (e.g., a mobile phone, a wearable smart device, an endpoint device deployed in a vehicle, or the like). The software application may comprise, for example, a navigation application, a video calling application, a gaming application, or another type of application.

In one example, the first device comprises a device that is separate from a device including the processing system. For instance, the processing system may be part of a user endpoint device (e.g., a mobile phone, a wearable smart device, or the like) that belongs to the subscriber, where the processing system supports the virtual presence projection service. However, the first device may comprise a device that does not belong to the subscriber (e.g., belongs to another person, to a company, to a public or governmental entity, etc.). In this case the processing system functions as a central controller that coordinates the operations of a plurality of other devices to project virtual presences. For instance, the processing system may be executing a navigation application on the subscriber's mobile phone while the subscriber is walking down the street. The first device may be mounted on a permanent structure (e.g., a lamp post, a building, a sign post, a traffic light, etc.) or a non-permanent structure (e.g., a vehicle, a drone, a mobile communications device of the subscriber or another individual, a wearable smart device of the subscriber or another individual, etc.) in the first location. It should be noted that a "permanent" structure is not necessarily a structure that can never be moved (e.g., as buildings can be demolished, street signs can be relocated or replaced, etc.), but is a structure that remains in a fixed place for an extended period of time (e.g., at least multiple days, months, or years). The first device may include a first set of resources for projecting virtual presences (e.g., light sources (e.g., lasers, light-emitting diodes, or organic light-emitting diodes), projectors, lens, mirrors, speakers, cameras, microphones, speedometers, and/or other types of sensors and output devices). The processing system may control the first device to project a virtual presence of a walking route when the subscriber is approaching the first device (e.g., is within x feet of the first device, e.g., 50 feet, 75 feet and so on).

The processing system may communicate with the first device via one or more wireless links. For instance, the processing system and the first device may communicate over a wireless network (e.g., WiFi, cellular, etc.). In another example, the processing system and the first device may communicate using a wireless technology standard for exchanging data over short distances, such as Bluetooth of near field communication (NFC). For instance, the processing system may continuously execute a discovery mode to discover other devices within communication range that are registered to lend resources for projecting virtual presences.

In one example, controlling the first device to project the virtual presence may include identifying a current viewing angle of the subscriber (and the current location of the subscriber relative to the first device) and sending instructions to the first device to adjust an orientation of the virtual presence based on the viewing angle, such that the virtual presence is not clearly visible to individuals other than the subscriber. For instance, the subscriber may be in a public location and may not want others to see the information being communicated via the virtual presence. In this case, certain image projection techniques may be employed to minimize the visibility of the virtual presence outside of the subscriber's viewing angle. The volume of any audio associated with the virtual presence may be similarly controlled to minimize the number of individuals, aside from the subscriber, who can clearly hear the audio. In a further example, the orientation and/or volume of the virtual presence may be adjusted based on a number of people who are viewing the virtual presence (e.g., the subscriber may be traveling with a companion).

In a further example, the orientation and/or audio may be adjusted to compensate for visual obstructions, loud noises, and other conditions of the surrounding environment which may impair the subscriber's ability to clearly see and/or hear the virtual presence. For instance, the volume of the audio may be temporarily raised as a loud motorcycle is driving past the subscriber, and then lowered once the motorcycle is out of earshot (or out of a detection range of the processing system and/or first device). Similarly, the brightness of the virtual presence may be adjusted to compensate for a glare caused by the setting sun or by lighting that may be set up around a construction zone.

In step 206, the processing system may compute a moving trajectory of the subscriber from the first location to a second location. The moving trajectory may comprise a route that the subscriber is expected to traverse from the first location to the second location. In one example, the moving trajectory may be inferred from knowledge of the subscriber's intended destination. For instance, if the processing system is executing a navigation application, the subscriber may have inputted the intended destination (e.g., an address, a landmark, or the like) to the navigation application in order to obtain directions. Thus, the processing system may know the route that the navigation application is presenting to the subscriber. In another example, where the processing system is executing an application that is not a navigation application, the moving trajectory may be inferred from the subscriber's previous locations, the subscriber's speed, knowledge of any nearby locations that the subscriber is known to frequent (e.g., the subscriber's home, office, gym, favorite grocery store, etc.), a map of the area surrounding the subscriber (which may show, for instance, which streets are one-way or two-way, any obstacles which may be present, the locations of intersections, etc.). Information about the subscriber's previous locations, speed, and the like may be received from the subscriber's endpoint device or from other devices or sensors in the surrounding areas that have detected information about the subscriber.

In one example, the second location may be the subscriber's intended destination (e.g., a final destination). In another example, the second location may simply be another location the subscriber is expected to pass between the first location and the intended destination.

In step 208, the processing system may identify a second device that is located along the moving trajectory, where the second device includes a second set of resources for projecting virtual presences (e.g., light sources, light-emitting diodes, organic light-emitting diodes, projectors, lens, mirrors, speakers, microphones, cameras, speedometers, and/or other types of sensors and output devices), and where the second device is registered with the virtual presence projection service to lend the second set of resources to subscribers of the virtual presence projection service.

Like the first device, the second device may be mounted on a lamp post, a building, a vehicle, a drone, or another object along the moving trajectory. As discussed above, the second device may be registered with the virtual presence projection service to lend the second set of resources to subscribers of the virtual presence projection service. It should be noted that the first device may also be registered with the virtual presence projection service to lend the first set of resources to subscribers. Thus, devices which include resources that can be used to project virtual presences may register with the virtual presence projection service. The virtual presence projection service may maintain a database that stores information about all devices registered with the service. For instance, for each registered device, the database may indicate the location of the device (e.g., global positioning coordinates, longitude/latitude, etc.), the nature of the resources to which the device has access, the approximate radius within which any virtual presences projected by the device are clearly visible, any limitations on use of the resources, the status of the device (e.g., powered on or off, functioning properly or not functioning properly, communicatively accessible by the processing system, etc.) and/or other information.

In one example, once the second device is identified, the processing system may send a request to the second device to reserve at least some resources of the second set of resources. For instance, the processing system may request that the second device not lend resources needed for projecting virtual presences to another device (i.e., a device other than the processing system) for a defined period of time (e.g., the next y minutes). This will help to ensure that the resources that are needed from the second device are available when the resources are actually needed for a hand off of the virtual presence, as discussed in further detail below.

In optional step 210 (illustrated in phantom), the processing system may detect that the subscriber will be outside the range of the first device within a predefined period of time (e.g., x seconds or less), based on the moving trajectory. In one example, "outside the range" may mean that the processing system is outside of communication range with the first device (e.g., no longer able to communicate wirelessly with the first device), the first device is outside the subscriber's field of view, or the projection range of the first device (e.g., the range within which the virtual presence projected by the first device is visible) is outside of the subscriber's field of view.

Detecting when the processing system is expected to be outside the range of the first device may be based on the subscriber's current position along the moving trajectory (e.g., as may be detected by a global positioning system or other location tracking techniques executed by the processor or by another device in communication with the processor), the subscriber's current speed along the moving trajectory (e.g., as may be determined by a global positioning system or by an accelerometer of the subscriber's device), and/or the subscriber's direction of gaze (e.g., as may be determined by a gaze tracking technique executed by the processor or by another device in communication with the processor such as a pair of smart glasses). For instance, the processing system may calculate an estimated time (or time frame) within which the subscriber is expected to be no longer within range of the first device, and the second device may then be identified within a predefined window of time (e.g., x seconds) prior to the estimated time to minimize delays in the handing off of the virtual presence, as discussed above.

In optional step 212 (illustrated in phantom), the processing system may control the first device to cease projecting the virtual presence. For instance, the processing system may send an instruction to the first device requesting that the first device stop projecting the virtual presence, in anticipation of the first device handing the virtual presence off to a second device (discussed in further detail below). In other examples, however, the processing system may not send an explicit instruction to the first device to cease projection. For instance, the first device may simply cease projecting the virtual presence when the first device detects that the processing system is no longer within range.

In step 214, the processing system may control a second device to project the virtual presence in the current field of view of the subscriber when the subscriber is no longer within range of the first device (e.g., outside of a communication range with the first device, the first device is no longer within the subscriber's field of view, or the projection range of the first device is no longer within the subscriber's field of view) but is within range of the second device.

In one example, the first device comprises a device that is separate from the device including the processing system. For instance, the second device, like the first device, may comprise a device that does not belong to the subscriber (e.g., belongs to another person, to a company, to a public or governmental entity, etc.). For instance, continuing the example of the navigation application executing on the subscriber's mobile phone, the second device may be mounted on a lamp post, a building, a vehicle, a drone, or another object along the moving trajectory. The second device may include a second set of resources for projecting virtual presences (e.g., light sources, projectors, speakers, cameras, microphones, speedometers, and/or other types of sensors and output devices). The processing system may control the second device to project the virtual presence of a walking route when the subscriber is approaching the second device (e.g., is within x feet of the second device), when the subscriber is out of communication range with the first device, or when the first device (or the projection range of the first device) is no longer within the subscriber's field of view.

The processing system may communicate with the second device via one or more wireless links. For instance, the processing system and the second device may communicate over a wireless network (e.g., public WiFi, a private WiFi hotspot, cellular, etc.). In another example, the processing system and the second device may communicate using a wireless technology standard for exchanging data over short distances, such as Bluetooth of near field communication (NFC). For instance, the processing system may continuously execute a discovery mode to discover other devices within communication range that include resources for projecting virtual presences. In one example, the processing system may communicate with the first device and the second device using the same type of wireless communication (e.g., using public WiFi to communicate with both the first device and the second device). In another example, however, the processing system may communicate with the first device and the second device using different types of wireless communication (e.g., using public WiFi to communicate with the first device, but Bluetooth to communicate with the second device).

In one example, controlling the second device to project the virtual presence may include identifying a current viewing angle of the subscriber and sending instructions to the second device to adjust an orientation of the virtual presence based on the viewing angle, such that the virtual presence is not clearly visible to individuals other than the subscriber. The volume of any audio associated with the virtual presence may be similarly controlled to minimize the number of individuals, aside from the subscriber, who can clearly hear the audio.

In another example, controlling the second device to project the virtual presence may include identifying a third device that is located along the moving trajectory, where the third device includes a third set of resources for projecting virtual presences (e.g., light sources (e.g., lasers, light-emitting diodes, or organic light-emitting diodes), projectors, lens, mirrors, speakers, cameras, microphones, speedometers, and/or other types of sensors and output devices), and where the third device is also registered with the virtual presence projection service to lend the third set of resources to subscribers of the virtual presence projection service. The processor may control the third device to cooperate with the second device to project the virtual presence. For instance, the second set of resources may include resources that allow the second device to project a virtual presence, but may not include resources that allow the second device to track the subscriber's viewing angle or direction of gaze. The third set of resources, however, may include resources that allow the third device to track the subscriber's viewing angle or direction of gaze. Thus, the third device may track the subscriber's viewing angle and may communicate information about the subscriber's viewing angle to the second device. The second device may then adjust the orientation of the virtual presence in response to the information received from the third device.

The method 200 may end in step 216.

Thus, examples of the method 200 may be used to facilitate a variety of applications that utilize virtual presences, even when the user is moving or may not have consistent access to a single device that is capable of projecting virtual presences. For instance, as discussed above, a user may be using a navigation application that projects directions in the form of virtual presences onto a heads up display that is part of the user's vehicle's windshield. Thus, when the user exits the vehicle, the virtual presences may no longer be available. However, the user may still require directions from the location at which the vehicle is parked to the user's final destination.

In another example, a user may be using an application that tracks a medical condition of the user. For instance, the user may be diabetic and may use an application on his smart watch to monitor his blood sugar level (e.g., potentially in conjunction with an insulin pump or other sensor). The application may be configured to control projection of virtual presences that ask for assistance and/or communicate information about the user's condition when the user's blood sugar level falls outside of a predefined range. For instance, the user may be prone to experiencing weakness and/or disorientation when his blood sugar level falls outside of the predefined range. In this case, projection of the virtual presences may alert other nearby individuals to the fact that the user may require assistance or medical attention.

In another example, a user may be using an application that maintains up to date medical information about a plurality of individuals. In this case, the application may be configured to present patient data for a plurality of patients of a doctor who is making rounds in a hospital. As the doctor moves from room to room, the virtual presence may move with the doctor and may change to present information about the patient on whom the doctor is currently checking, or to inform the doctor of an order in which the doctor is to visit with patients.

In another example, a user may be using an application for video calling. In this case, the application may be configured to control projection of virtual presences of other participants of a video call (e.g., all at once, or one at a time based on who is currently speaking, etc.). This may free the user up from looking down at his phone screen, which may be dangerous if the user is simultaneously engaged in another activity (such as walking, cooking, using equipment at the gym, etc.). This may also provide a more personal experience for the user.

In another example, a user may be using an application for law enforcement. In this case, an application may be configured to control projection about an individual or object that is registered in a law enforcement, governmental, and/or public database. For instance, a police officer may pull a driver over for speeding, and may be able to use the driver's license number, the vehicle's license plate, or the vehicle's registration number to look up further information, which may in turn be projected as a virtual presence by a heads up display of the police car. When the police officer exits the police car (and no longer has a view of the heads up display), the virtual presence may be projected by other devices in the surrounding area (e.g., devices mounted on street signs or buildings, devices mounted on the exterior of the police car, drones, etc.).

Moreover, although the processing system is discussed within the context of the method 200 as functioning as a controller (for one or more other devices that project the virtual presences), it will be appreciated that in some cases, the device of which the processing system is a part may also cooperate to project the virtual presence. For instance, the device of which the processing system is a part may not have the resources to project the image portion of the virtual presence. However, the device of which the processing system is a part may include a speaker that is capable of playing audio associated with the virtual presence.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 206-212. For example, the processing system may continuously monitor the subscriber's moving trajectory for as long as the processing system is executing the application in conjunction with the virtual presence projection service, and may continuously adjust parameters such as selecting additional devices to which to hand off the virtual presence, adjusting the orientation of the virtual presence, adjusting the volume of audio associated with the virtual presence, and the like. In other words, the method 200 may borrow resources from any number of devices along the moving trajectory in order to present a continuous virtual presence as the subscriber is moving. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Moreover, use of numerical terms like "first," "second," "third," and the like is meant to differentiate between items or actions of the same nature, but does not necessarily imply that any specific number of the items or actions is required. For instance, a reference to a "first device" and a "second device," does not necessarily imply that only two devices are involved (e.g., additional devices could be involved). Similarly, a reference to a "second set of resources" may not necessarily imply the existence of a "first set of resources."

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for projecting virtual presences along a user's moving trajectory, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for projecting virtual presences along a user's moving trajectory (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for projecting virtual presences along a user's moving trajectory (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
controlling, by a processing system including at least one processor, a first device in a first location to project a virtual presence in a current field of view of a subscriber of a virtual presence projection service;
computing, by the processing system, a moving trajectory of the subscriber, wherein the moving trajectory comprises a route that the subscriber is expected to traverse while moving from the first location to a second location;
identifying, by the processing system, a second device that is located along the moving trajectory, wherein the second device includes a second set of resources for projecting virtual presences, wherein the second device is registered with a database maintained by the virtual presence projection service to lend the second set of resources to subscribers of the virtual presence projection service, wherein an entry for the second device in the database indicates a location of the second device, and wherein the identifying comprises determining that the location of the second device as indicated by the entry coincides with the route that the subscriber is expected to traverse; and
controlling, by the processing system, the second device to project the virtual presence in the current field of view of the subscriber when the subscriber is no longer within range of the first device but is within range of the second device.

2. The method of claim 1, further comprising, subsequent to the identifying but prior to controlling the second device to project the virtual presence:
detecting, by the processing system, that the subscriber will be outside a range of the first device within a predefined period of time, based on the moving trajectory; and
controlling, by the processing system, the first device to cease projecting the virtual presence.

3. The method of claim 1, wherein the first device is part of a vehicle.

4. The method of claim 3, wherein the first device comprises a heads up display of a windshield of the vehicle.

5. The method of claim 1, wherein the processing system comprises a processing system of a mobile device of the subscriber, and wherein the processing system is executing an application that supports the virtual presence projection service.

6. The method of claim 1, wherein the second device is part of a permanent structure that is located along the moving trajectory.

7. The method of claim 6, wherein the second device is part of at least one of: a building, a lamp post, a sign post, or a traffic light.

8. The method of claim 1, wherein the second device is part of a non-permanent structure that is located along the moving trajectory.

9. The method of claim 8, wherein the second device is part of at least one of: a mobile communications device, a wearable smart device, a drone, or a vehicle.

10. The method of claim 1, wherein the controlling the second device to project the virtual presence comprises:
identifying, by the processing system, a viewing angle of the subscriber; and
adjusting, by the processing system, an orientation of the virtual presence based on the viewing angle, such that the virtual presence is visible to the viewing angle of the subscriber.

11. The method of claim 1, wherein the second device belongs to an entity other than the subscriber.

12. The method of claim 1, further comprising:
calculating, by the processing system and based on the moving trajectory, an estimated time at which the subscriber is expected to be no longer within range of the first device, wherein the identifying is performed within a predefined window of time prior to the estimated time.

13. The method of claim 1, wherein the second set of resources includes at least one of: a light source, a projector, a camera, a mirror, a lens, a speaker, a microphone, or a speedometer.

14. The method of claim 1, further comprising:
identifying, by the processing system, a third device that is located along the moving trajectory, wherein the third device includes a third set of resources for projecting virtual presences, wherein the third device is registered with the database maintained by virtual presence projection service to lend the third set of resources to subscribers of the virtual presence projection service, wherein an entry for the third device in the database indicates a location of the third device, and wherein the identifying the third device comprises determining that the location of the third device as indicated by the entry for the third device coincides with the route that the subscriber is expected to traverse; and
controlling, by the processing system, the third device to cooperate with the second device to project the virtual presence.

15. The method of claim 1, wherein the virtual presence relates to navigation.

16. The method of claim 1, wherein the virtual presence relates to a medical condition of the subscriber.

17. The method of claim 1, wherein the virtual presence relates to a video call.

18. The method of claim 1, wherein the virtual presence relates to law enforcement.

19. A non-transitory computer-readable medium storing instructions which, when executed by a processing system including at least one processor, cause the processing system to perform operations, the operations comprising:
controlling a first device in a first location to project a virtual presence in a current field of view of a subscriber of a virtual presence projection service;
computing a moving trajectory of the subscriber, wherein the moving trajectory comprises a route that the subscriber is expected to traverse while moving from the first location to a second location;
identifying a second device that is located along the moving trajectory, wherein the second device includes a second set of resources for projecting virtual presences, wherein the second device is registered with a database maintained by the virtual presence projection service to lend the second set of resources to subscribers of the virtual presence projection service, wherein an entry for the second device in the database indicates a location of the second device, and wherein the identifying comprises determining that the location of the second device as indicated by the entry coincides with the route that the subscriber is expected to traverse; and controlling the second device to project the virtual presence in the current field of view of the subscriber when the subscriber is no longer within range of the first device but is within range of the second device.

20. An apparatus comprising:

a processing system including at least one processor; and a computer-readable medium storing instructions which, when executed by the processing system, cause the processing system to perform operations, the operations comprising:

controlling a first device in a first location to project a virtual presence in a current field of view of a subscriber of a virtual presence projection service;

computing a moving trajectory of the subscriber, wherein the moving trajectory comprises a route that the subscriber is expected to traverse while moving from the first location to a second location;

identifying a second device that is located along the moving trajectory, wherein the second device includes a second set of resources for projecting virtual presences, wherein the second device is registered with a database maintained by the virtual presence projection service to lend the second set of resources to subscribers of the virtual presence projection service, wherein an entry for the second device in the database indicates a location of the second device, and wherein the identifying comprises determining that the location of the second device as indicated by the entry coincides with the route that the subscriber is expected to traverse; and controlling the second device to project the virtual presence in the current field of view of the subscriber when the subscriber is no longer within range of the first device but is within range of the second device.

* * * * *